United States Patent [19]
Spiotta et al.

[11] Patent Number: 5,377,187
[45] Date of Patent: Dec. 27, 1994

[54] ADDRESSING METHOD AND APPARATUS FOR A DATA CONVEYANCE MODULAR NETWORK

[75] Inventors: Mark G. Spiotta, Algonquin; Juan C. Santiago, Elmhurst, both of Ill.

[73] Assignee: Motorola, Inc., Schaumburg, Ill.

[21] Appl. No.: 753,557

[22] Filed: Sep. 3, 1991

[51] Int. Cl.$^5$ ............................................... H04J 3/02
[52] U.S. Cl. ..................................... 370/85.1; 370/67; 370/85.4; 370/85.9
[58] Field of Search ................. 370/85.4, 79, 67, 85.9, 370/85.1

[56] References Cited

U.S. PATENT DOCUMENTS

| | | | |
|---|---|---|---|
| 4,370,743 | 1/1983 | Moran | 370/67 |
| 4,864,576 | 9/1989 | Mark | 370/85.4 |
| 5,105,421 | 4/1992 | Gingell | 370/67 |

Primary Examiner—Douglas W. Olms
Assistant Examiner—Russell W. Blum
Attorney, Agent, or Firm—Timothy W. Markison

[57] ABSTRACT

An addressing apparatus and method may be obtained in a data conveyance network by providing modular circuits with an addressing circuit and incorporating a coupling sense circuit. When a modular circuit is connected into the data conveyance modular network, the coupling sense circuit allows for a assignment token to be passed to the modular circuit such that the modular circuit can determine addresses of time slots which are to be allocated to it. The assignment token is only passed amongst the modular circuits at initial turn on of the data conveyance modular network or when a reset condition occurs which is triggered by a data conveyance controller.

19 Claims, 3 Drawing Sheets

ADDRESSING METHOD AND APPARATUS FOR A DATA CONVEYANCE MODULAR NETWORK

FIELD OF THE INVENTION

This invention relates generally to data conveyance modular systems and in particular to a method and apparatus for establishing time slot addresses for modular circuits.

BACKGROUND OF THE INVENTION

Data conveyance systems, or data communication systems, are known to comprise a data bus and a plurality of peripheral circuits that access the data bus. In some systems, one of plurality of peripheral circuits is designated as a data control circuit to coordinate access the data bus to prevent several peripheral circuits accessing the data bus at the same time. Yet in other systems, the system may further comprise a data controller module that coordinates access to the data bus. The data bus is typically a digital data bus and may incorporate time division multiplexing (TDM). A TDM digital bus is time divided in to time slots and each time slot has an address based on a time relationship within a frame cycle. For the peripheral circuits to transmit and receive data either to other units or to the data controller, they must be exclusively assigned at least one time slot.

In many applications, the data conveyance system or modular network, physically comprises a card cage with a limited number of connectors such that peripheral, or modular, circuits may be plugged into the card cage. The connectors are usually coupled together by a back plane which also supports the TDM bus. Typically, the time slots are assigned to modular circuits based on their physical location within the card cage. This results because the card cage is hard wired to the back plane such that the first connector typically is allocated the first time slot. This presents a problem in that if a connector is empty or is connected to a modular that does not need to access the TDM bus, at least one time slot is still assigned to the connector, thus wasting at least one time slot.

An alternative to having fixed time slot addresses is to have each modular circuit contain a specific time slot address such that regardless of its position in the card cage it will know which time slot to access in the TDM bus. This presents a problem in that, if DIP switches are used to establish the time slot address, manual operations are required which could result in an error occurring.

Therefore, a need exists for a method and apparatus that eliminates the hard wiring addressing scheme of time slots and also eliminates the need for manual programming of time slot addresses on each module.

SUMMARY OF THE INVENTION

These needs and others are substantially met by the addressing method and apparatus for data conveyance modular networks disclosed herein. By implementing an addressing apparatus as disclosed herein on a modular circuit of a data conveyance modular network, the above mentioned problems can be substantially eliminated. The addressing apparatus comprises a bus clock synchronization circuit, a time slot trigger circuit, and a slot determination circuit. The bus clock synchronization circuit synchronizes the addressing apparatus to the bus clock of the data conveyance modular network. The time slot trigger circuit, which is coupled to the bus clock synchronization circuit, determines when the TDM digital bus is available for that particular modular circuit. The slot determination circuit determines, from when the TDM digital bus is available, the address of at least one time slot which is to be used by this particular modular circuit.

DESCRIPTION OF A PREFERRED EMBODIMENT

Figure 1:
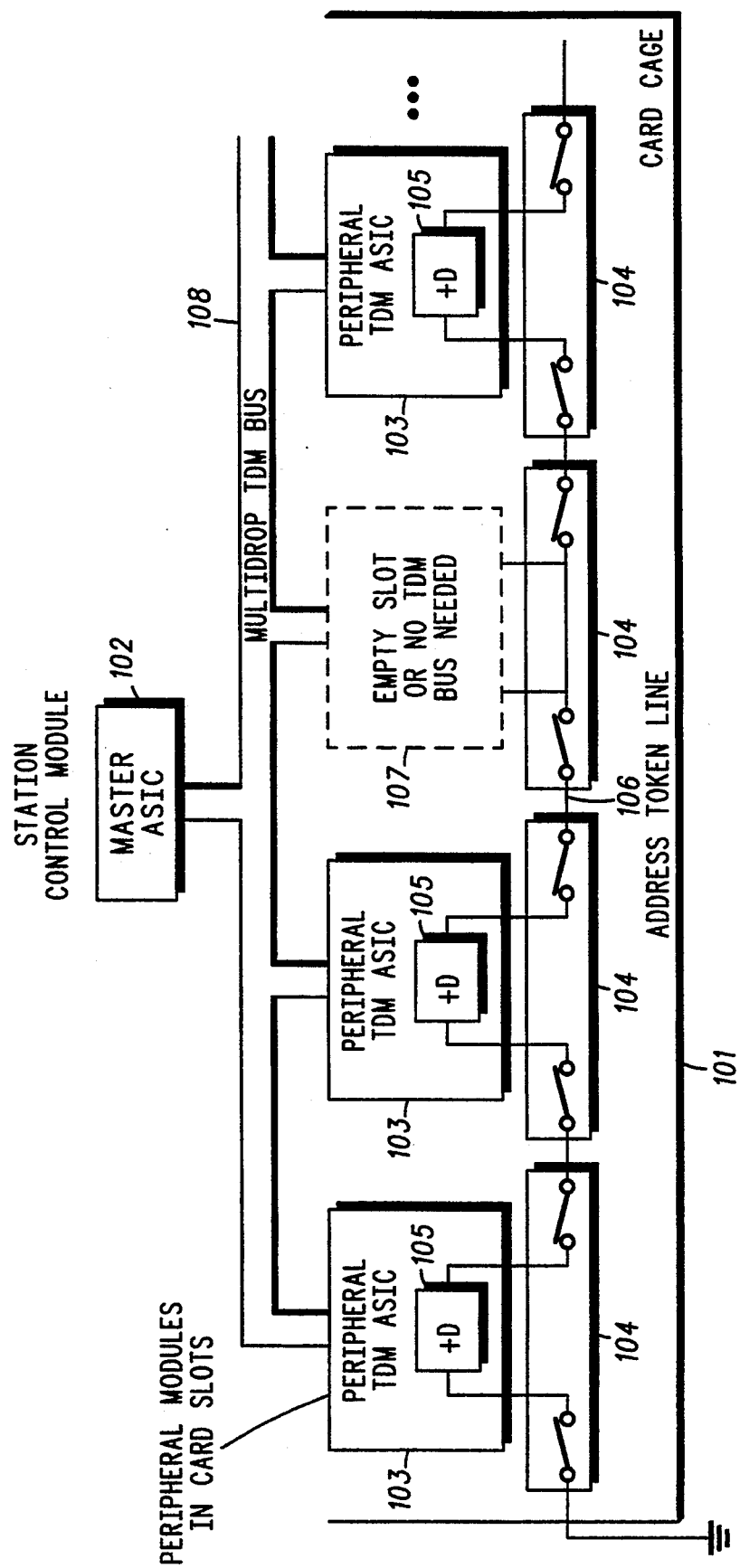
FIG. 1 illustrates a block diagram of a data conveyance modular network incorporating the present invention.

In an environment such as a base station of a trunked or conventional communication system, data is typically transferred from a repeater to a communication destination via a communication destination interface. A communication destination may be a central controller of a trunked or conventional communication system, a telephone system network, or to a console directly. The repeater typically transceives information from mobile radios and or portable telephones. This information transceived by the repeater is digitized by a digital signal processor (DSP) and is conveyed to the appropriate communication destination interface via a TDM digital bus. In such base stations, an optimal mechanical design is to have the communication destination interface modules designed as modular circuits that plugged into a card cage. The card cage structure typically includes a back plane which supports connectors and the TDM bus. Typically, the back plane supports up to three TDM buses used for signalling and/or for data.

In addition to the modular circuits plugging in to the card cage, the transmitter, receiver, and a data conveyance controller also plug in to the card cage. The data conveyance controller controls access to the TDM digital bus, contains the frame cycle clock and the bus clock, and contains the DSP. The modular circuits and the data conveyance controller require access to the TDM digital bus, however, the transmitter and receiver modules do not.

With the above described architecture of a base station, it is apparent that an efficient addressing scheme is required that allows for flexibility in changing the addressing configuration of the base station. Generally, this can be accomplished by providing each modular circuit that requires access to the TDM digital bus with a addressing apparatus. In addition to the addressing apparatus, a plurality of switches are mounted on the back plane, or incorporated in to the connectors, to detect when a modular circuit with an addressing apparatus on it is connected into a connector. At initial turn on or under a reset condition, the first modular circuit with an addressing apparatus on it receives an assignment token. The assignment token enables the addressing apparatus to determine which time slots of the TDM digital bus are being assigned to this particular modular circuit. Once the first modular circuit has established its time slots, it passes the assignment token to the next connector. If the next connector has a modular circuit with an addressing apparatus on it, the time slots assigned to this modular circuit will be determined. If the next connector does not have a modular circuit plugged into it or a modular circuit without an addressing apparatus on it, the switch on the back plane remains closed and passes the token to the next connector until a connector is found with a modular circuit with an addressing apparatus plugged in to it or the frame cycle ends. This procedure is done in synchronization with the frame sync signal and bus clock such that by counting the number of clock cycles that have passed from the beginning of the frame cycle until the address token is received, the addressing apparatus can determine which time slots its modular circuit is to access.

FIG. 1 illustrates a data conveyance modular network 100 that may be incorporated into a base station. The data conveyance network 100 comprises a card cage 101, a station control module or a data conveyance controller 102, a plurality of modular circuits 103, a limited number of coupling sensor switches 104, a plurality of addressing apparatus or circuits 105 located on each of the plurality of modular circuits 103, an address token line 106, and an empty slot or a modular circuit that does not require access to the TDM bus 107.

Unlike prior art systems, addressing of the TDM bus is not fixed based on physical location in the card cage. In contrast the present invention performs the addressing after turn on or reset. This condition causes the modular circuits to lose any previous information about their time slot address assignments. In addition, at this time, only the station control module is allowed to write on the TDM bus. All other writes to the TDM bus by modular units are disabled to avoid bus contention but are still able to read data from the bus. In particular, each of the modular circuits are allowed to read the command channel at the end of the frame. (The command channel will be discussed further with reference to FIG. 2).

To assign addresses of time slots to the modular circuits, the station controller 102 sets bit seven of the command slot No. 1 to a predetermined condition. Typically, this will be to a logic 1 state. Once the modular circuits 103 read this bit, they enter an addressing mode. During the next frame cycle, the modular circuits 103 look for the assignment token. This assignment token as shown on FIG. 1 is a logic 0 which is passed along the address token line 106. If the first card cage location contains a modular circuit that has an addressing apparatus or circuit 105 on it, the coupling sensor 104 is open such that the addressing token is inputted into the addressing circuit 105. Typically, the assignment token will be delayed by one TDM time slot to allow for proper synchronization. In the alternative, the coupling sensor may be a resistor which would be shorted when a modular circuit is connected with a connector.

When a modular circuit detects or has access to the assignment token, it looks at a counter internal to the addressing circuit 105 to determine the number of time slots that have passed from the beginning of the frame cycle to the time at which it received the assignment token. Once the addressing circuit has obtained an address for at least one time slot, it passes the token to the next connector in the card cage. Typically, a modular circuit will hold the assignment token for the duration of two time slots, one for transmit and the other for receive. If the next connector in the card cage contains an empty slot or a modular circuit that does not need access to the TDM bus 107, the address token is passed down the address token line because the coupling sensor switch is closed for that particular connector in the card cage. Once the address token has been passed throughout the card cage, which occurs during one frame cycle, the addressing cycle is complete until a reset condition occurs. A reset condition may occur at the prompting of the station controller and it may be prompted by the addition or deletion of a modular circuit from the card cage or simply a change in position of a modular circuit within the card cage. Other reset conditions may also be invoked to reestablish the addressing scheme of the data conveyance network.

Figure 2:
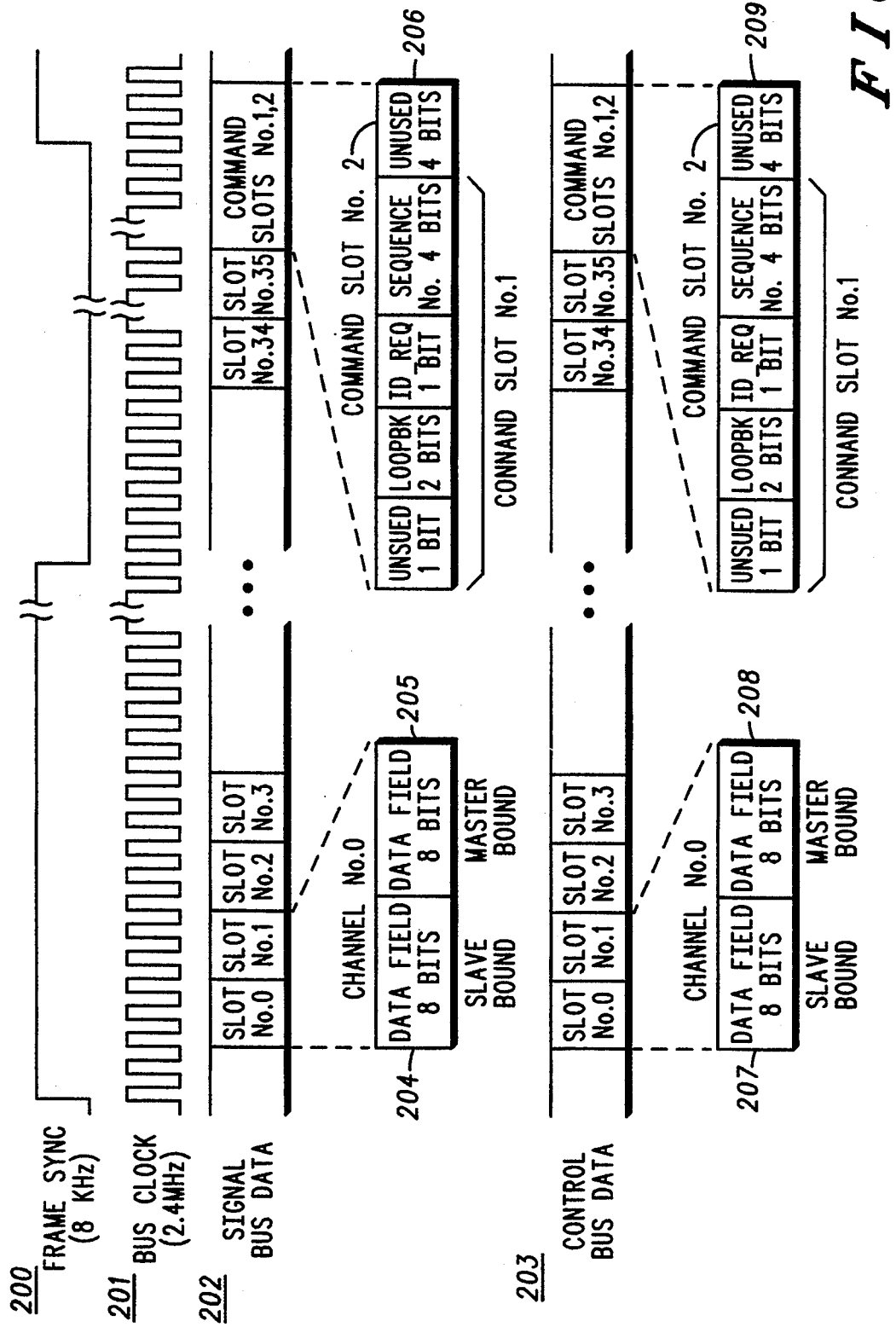
FIG. 2 illustrates a timing diagram and slot location assignments of the TDM digital bus.

FIG. 2 illustrates the timing diagram of the data conveyance network. Line 200 illustrates the frame sync signal which operates at approximately 8 kilohertz. 201 illustrates the bus clock signal which is operating at 2.4 megahertz and is synchronized to the frame sync signal 200. A signal bus data and its time slot locations are illustrated by 202 and a control bus data TDM time slot assignments is shown at 203. The TDM bus is divided into 36 slots and two command slots. The 36 slots are allocated in the above described manner.

Blocks 204 and 205 illustrate the first slot number zero and slot number 1 and are allocated to a particular modular circuit. Typically, slot zero is reserved for the modular circuit to receive data from the data conveyance controller and slot number 1 is reserved for the modular circuit to transmit data to the data conveyance controller. As eluded to above, the command slots are only written to by the data conveyance controller 102 and are read by all the modular circuits 103. The sequence number which comprises a 4 bit section of command slot one is a digital clock signal provided by the data conveyance controller to help maintain synchronization with the modular circuits. Each of the modular circuits may monitor these bits to determine if they are in sync with the data conveyance controller. If the data conveyance controller detects that a modular circuit is out of sync, it evokes a diagnostic test to determine the error. The other bits may be used for diagnostic commands.

As mentioned, the data conveyance controller 102 may perform diagnostics tests of the data conveyance modular network. The diagnostic tests are register write/read back tests, frame sync fault detection, bus clock fault detection, internal TDM loop back, and external TDM loop back. Each of these tests build upon the success of the prior test so it is recommended that they be executed in order. The register write/read back test permits the data conveyance controller which contains a processor and a register to be tested. The frame sync fault detection circuit allows the data conveyance controller to determine the accuracy of the frame sync circuit. Similarly, the bus clock fault detection circuit allows the data conveyance controller to determine the accuracy of the bus clock.

The internal loop back test instructs the modular circuits to short circuit themselves at the TDM bus connection such that the data conveyance controller can perform a diagnostic check of the TDM bus. The external loop back test instructs the modular circuits to short circuit at the output such that the data conveyance controller may verify the data conveyance integrity of the modular circuit as well as the TDM bus. During these diagnostic tests, the modular circuits are instructed not to transmit data for this frame cycle such that the diagnostic checks may be performed. In addition, by having the diagnostics contained in the data conveyance controller, the modular circuits do not need to contain any diagnostic test circuitry other than what is needed to assist the data conveyance controller. This allows for reduced expenses in the manufacture of modular circuits and provides for a central location of diagnostic testing.

In addition to the above, the data conveyance controller may ID REQ bits of the command slot which requests each of the modular circuits to transmit their IDs to the data conveyance controller. The IDs of the modular circuits comprise information as to what type of module it is and also indicates that there is a module present at a particular time slot. The data conveyance controller may include additional memory devices to house a database for storing the IDs of the modular circuits that are present in the data conveyance modular network.

Figure 3:
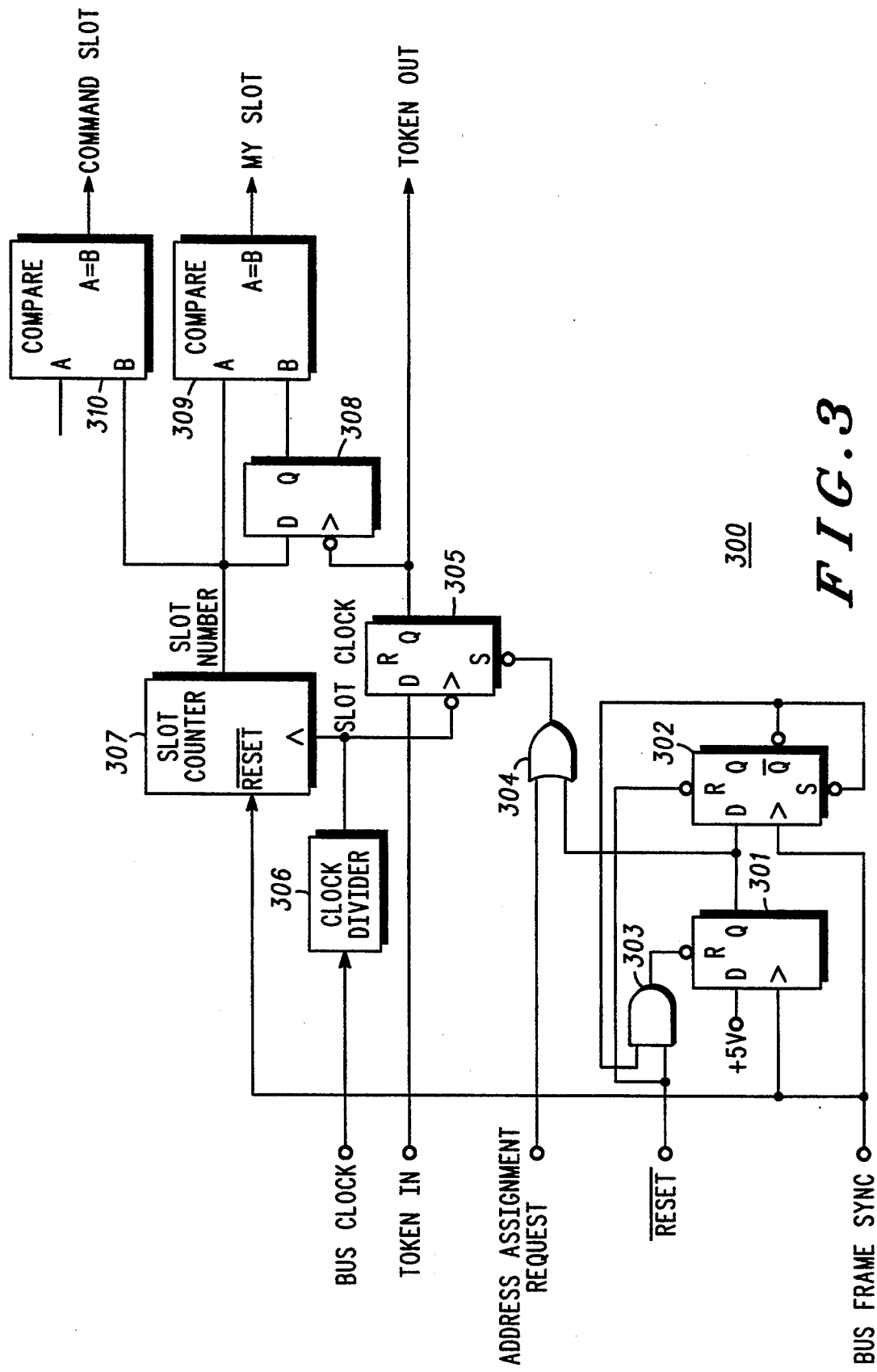
FIG. 3 illustrates a block diagram of the addressing apparatus which may be utilized by a modular circuit.

FIG. 3 illustrates a block diagram of the addressing apparatus or circuit 105. The addressing circuit 105 comprises a bus frame synchronization circuit, an address, or assignment, token circuit, and a time slot determination circuit. Wherein, D flipflops 301 and 302 and an AND gate 303 comprises the bus frame synchronization circuitry; OR gate 304 and D flipflop 305 comprise the address token circuit; and clock divider 306, slot counter 307, D flipflop 308, and comparators 309 and 310, comprise the time slot determination circuit. The frame synchronization circuit utilizes the frame signal and the bus clock signal to provide synchronization to the addressing circuit. In addition, the time slot determination circuit uses the bus clock signal to determine the address of the times slot assigned to the modular circuit on which the addressing circuit sits. The time slot determination circuit determines the time slot address by counting the number of clock cycles that have passed from the beginning of the frame cycle until it receives the assignment token. Once the assignment token is received, comparators 309 and 310 determine the address of the time slot and the address of the command slot, or when the TDM bus is made available to its modular circuit. The assignment token is passed from one modular circuit to the next via the address token line as described above. Once the address circuit has determined the address of the time slots for its modular circuit, the address token is passed to the next address circuit on the rising edge of the next clock cycle.

The above description describes a particular application of the addressing circuit in a data conveyance system. However, to a skilled practitioner, other applications of the addressing circuit in a data conveyance system may be readily derived without deviating from the scope of this invention.

We claim:

1. An addressing apparatus for use by a module circuit that accesses a Time Division Multiplexing (TDM) digital bus in a data conveyance modular network such that when the module circuit is operably coupled to the data conveyance modular network it accesses at least one time slot in the TDM digital bus, the addressing apparatus comprises:

bus clock synchronization means for syncing the addressing apparatus to a bus clock of the data conveyance modular network;

time slot trigger means, operably coupled to the bus clock synchronization means, for indicating, based on configuration of the data conveyance modular network following a reset condition or initial turn-on, when the TDM digital bus is available;

slot determination means, operably coupled to the bus clock synchronization means and the time slot trigger means, for determining the at least one time slot; and diagnostic means, operably coupled to the bus synchronization, for, upon prompting from the data coveyance modular network, preventing the modular circuit from accessing the TDM digital bus for at least one frame cycle and providing a return path to the data conveyance modular network such that when the data conveyance modular network performs a diagnostic test it tests at least one time slot.

2. In the addressing apparatus of claim 1, the diagnostic means further comprises a second return path such that when the data conveyance modular network performs a diagnostic test is tests the modular circuit.

3. In the addressing apparatus of claim 1, the time slot trigger means further comprises signalling means for signalling to another addressing apparatus on another module circuit that the TDM digital bus is no longer available for the modular circuit that it is used by.

4. A method for assigning at least one time slot of a Time Division Multiplexing (TDM) digital bus to a modular circuit in a data conveyance modular network, the method comprises the steps of:

a) connecting the modular circuit to the data conveyance network and detecting connection of the modular circuit to the data conveyance network by detecting a discontinuity of an electrical path that indicates physical connection of the modular circuit to the data conveyance modular network;

b) receiving, by the modular circuit, an assignment token during a frame cycle following an initial turn-on or a reset condition;

c) determining, by the modular circuit, an address of the at least one time slot assigned to the modular circuit based on when the assignment token was received within the frame cycle; and d) transferring, by the modular circuit, the assignment token to another modular circuit in the data conveyance network when the modular circuit has determined the address of the at least one time slot assigned to the modular circuit.

5. In the method of claim 4, step (c) further comprises determining the address of the at least one time slot by counting the number of time slots that have been active since the beginning of the frame cycle prior to receiving the assignment token.

6. The method of claim 4 further comprises the step of deassigning the at least one time slot when the modular circuit is no longer connected to the data conveyance modular network.

7. An addressing apparatus for use by a modular circuit that plugs into a card cage of a data conveyance modular network to access at least one Time Division Multiplexing (TDM) digital bus of the data conveyance modular network, the addressing apparatus comprises:

assignment token means for receiving and transferring an assignment token during a first frame cycle following initial turn-on or a reset condition;

time slot counting means, operably coupled to the assignment token means, for counting the number of time slots that have been active since the beginning of the first frame cycle prior to receiving the assignment token; and determination means, operably coupled to the time slot counting means, for determining an address of at least one time slot assigned to the modular circuit based on when the assignment token is received and the number of time slots that have been active prior to receiving the assignment token; and bus clock synchronization means for syncing the addressing apparatus to a bus clock of the data conveyance modular network.

8. The addressing apparatus of claim 7 further comprises a substrate on which the assignment means, time slot counting means, and determination means are mounted to produce an integrated circuit.

9. An improved data conveyance network that includes a limited number of couplings, a Time Division Multiplexing (TDM) digital bus, and a data conveyance controller, wherein at least some of the limited number of couplings connect modular circuits to the TDM digital bus and the data conveyance controller, wherein the improvement comprises:

coupling sensor means, operably coupled to the limited number of couplings for individually sensing when a modular circuit is connected to a coupling of the limited number of couplings;

assignment token means operably coupled to the coupling sensor means and the data conveyance controller, for transferring an assignment token from one of the limited number of couplings that has a modular circuit connected to it to another one of the limited number of couplings that has a modular circuit connected to it; and time slot addressing means of the data conveyance controller, operably coupled to each of the limited number of couplings and the assignment token means, for maintaining address assignment of at least one time slot of the TDM digital bus to a modular circuit that is connected to one of the limited number of couplings.

10. The improved data conveyance network of claim 9 further comprises diagnostic means, operably coupled to the data conveyance controller, for performing diagnostic checks on the TDM digital bus and on each modular circuit that is connected to one of the limited number of couplings.

11. An improved addressing method for a data conveyance modular network, wherein the data conveyance modular network includes a limited number of couplings, a Time Division Multiplexing (TDM) digital bus, and a data conveyance controller, wherein at least some of the limited number of couplings connect modular circuits to the TDM digital bus and the data conveyance controller, the improved method comprises the steps of:

a) sensing when a modular circuit is connected to one of the limited number of couplings;

b) transferring, upon initiation, an assignment token from a first one of the limited number of couplings that has a modular circuit connected to it to a second one of the limited number of couplings that has a modular circuit connected to it; and c) maintaining address assignments of at least one time slot of the TDM digital bus to a modular circuit that is coupled to one of the limited number of couplings.

12. In the method of claim 11, the initiation of step (b) comprises a data signal being transmitted by the data conveyance controller to each of the modular circuits that are coupled to a coupling of the limited number of couplings to indicate that the next frame cycle will be used to establish time slot assignments.

13. In the method of claim 11, the initiation of step (b) comprises sensing an initial turn-on of the data conveyance network.

14. The method of claim 11 further comprises performing a diagnostic check of the TDM digital bus by the data conveyance controller by transmitting a data signal to each of the modular circuits that are coupled to a coupling of the limited number of couplings to indicate that the next frame cycle will be used to verify the integrity of the TDM digital bus.

15. The method of claim 11 further comprises performing a diagnostic check of the TDM digital bus by the data conveyance controller by transmitting a data signal to each of the modular circuits that are coupled to a coupling of the limited number of couplings to indicate that the next frame cycle will be used to verify the data conveyance integrity of each of the modular circuits that are coupled to a coupling of the limited number of couplings.

16. An improved data conveyance modular network, wherein the data conveyance modular network includes a card cage with a limited number of connections, at least one TDM digital bus, a data conveyance controller, and a back plane that interfaces the limited number of connections with the TDM digital bus and the data conveyance controller, and wherein at least some of the limited number of connections have modular circuits connected to them, wherein the improvement comprises:

a limited number of sensing switches, each operably coupled to the limited number of connections and the back plane, wherein individual switches have a low impedance when a modular circuit is not connected to a corresponding connection of the limited number of connections and have a high impedance when a modular circuit is connected to a corresponding connection of the limited number of connections;

assignment token means, operably coupled to the limited number of sensing switches and the data conveyance controller, for transferring an assignment token to a modular circuit through the connection of the limited number of connections that it is connected to when the corresponding sensing switch is in a high impedance state and bypassing a connection of the limited number of connections when the corresponding sensing switch is in a low impedance state, and time slot addressing means, operably coupled to each of the limited number of connections and the assignment token means, for maintaining address assignments of at least one time slot of the TDM digital bus to a modular circuit that is connected to one of the limited number of connections.

17. The improved data conveyance network of claim 16 further comprises diagnostic means, operably coupled to the data conveyance controller, for performing diagnostic checks on the TDM digital bus and on each modular circuit that is connected to one of the limited number of connections.

18. The improved data conveyance network of claim 16 further comprises on each modular circuit connected to a connection of the limited number of connections an identification code indicating which type of modular circuit it is.

19. The improved data conveyance network of claim 18 further comprises memory means in the data conveyance controller for maintaining a database of the modular circuits connected to the data conveyance modular network and configuration of the data conveyance modular network.

* * * * *